United States Patent
Lutz

(10) Patent No.: US 8,055,883 B2
(45) Date of Patent: Nov. 8, 2011

(54) PIPE SCHEDULING FOR PIPELINES BASED ON DESTINATION REGISTER NUMBER

(75) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 300 days.

(21) Appl. No.: 12/458,162

(22) Filed: Jul. 1, 2009

(65) Prior Publication Data

US 2011/0004743 A1    Jan. 6, 2011

(51) Int. Cl.
*G06F 9/30*   (2006.01)
(52) U.S. Cl. ........................ 712/215; 712/214
(58) Field of Classification Search .................. 712/214, 712/215
See application file for complete search history.

(56) References Cited

U.S. PATENT DOCUMENTS

| | | | | |
|---|---|---|---|---|
| 5,678,016 A | * | 10/1997 | Eisen et al. | 712/216 |
| 6,195,744 B1 | * | 2/2001 | Favor et al. | 712/215 |
| 6,219,780 B1 | * | 4/2001 | Lipasti | 712/215 |
| 6,944,750 B1 | * | 9/2005 | Sheaffer | 712/215 |
| 2009/0260013 A1 | * | 10/2009 | Heil et al. | 718/103 |

* cited by examiner

*Primary Examiner* — William M Treat
(74) *Attorney, Agent, or Firm* — Nixon & Vanderhye P.C.

(57) ABSTRACT

A data processing apparatus 1 has a plurality of registers 10 of the same type of register and a plurality of processing pipelines 40, 50, each processing pipeline 40, 50 being arranged to process instructions. At least one instruction includes a destination register specifier specifying which of said registers is a destination register for storing a processing result of the at least one instruction. Instruction issuing circuitry 26 is configured to issue the at least one instruction for processing by one of the plurality of processing pipelines. The instruction issuing circuitry 26 selects the one of the plurality of processing pipelines to which the candidate instruction is issued in dependence upon the value of the destination register specifier of the candidate instruction.

19 Claims, 3 Drawing Sheets

PIPE SCHEDULING FOR PIPELINES BASED ON DESTINATION REGISTER NUMBER

BACKGROUND OF THE INVENTION

1. Field of the Invention

The present invention relates to the field of data processing. In particular, the invention relates to pipeline scheduling of instructions.

2. Description of the Prior Art

Some data processing apparatuses have two or more processing pipelines for processing a sequence of program instructions. It is possible that one instruction requires a result of a preceding instruction in order to be executed. In such cases, the result of the preceding instruction is forwarded to the later instruction to be used as an operand. Forwarding between instructions being processed by different pipelines is slower and more expensive than forwarding between instructions in the same pipeline. Therefore, it is desirable to reduce the amount of inter-pipeline forwarding.

SUMMARY OF THE INVENTION

Viewed from one aspect the present invention provides an apparatus for processing data under control of instructions, said apparatus comprising:

a plurality of registers of a same type of register, said instructions including at least one instruction having a destination register specifier specifying which of said plurality of registers is a destination register for storing a processing result of said at least one instruction;

a plurality of processing pipelines, each processing pipeline configured to process said instructions and to store processing results of said instructions in said plurality of registers; and instruction issuing circuitry configured to issue said at least one instruction for processing by one of said plurality of processing pipelines, said instruction issuing circuitry being configured to select said one of said plurality of processing pipelines in dependence upon a value of said destination register specifier of said at least one instruction.

At least one instruction includes a destination register specifier specifying which of a plurality of registers of the same type of register is a destination register for storing a processing result of the instruction. The present technique recognizes that forwarding of operand values is more likely between instructions specifying the same destination register than between instructions using different destination registers. Therefore, the apparatus is provided with instruction issuing circuitry that selects one of a plurality of processing pipelines in dependence upon the value of the destination register specifier and issues the candidate instruction for processing by the selected one of the processing pipelines. By scheduling the instructions so that instructions specifying the same destination register are issued to the same one of the plurality of processing pipelines, the amount of forwarding between different pipelines is reduced and hence the performance of the system is improved and less power is consumed in processing a sequence of instructions.

The plurality of processing pipelines may include a first processing pipeline and a second processing pipeline, and the instruction issuing circuitry may be configured to issue the at least one instruction to the first processing pipeline if the value of the destination register specifier is odd, and to issue the at least one instruction to the second processing pipeline if the value of the destination register specifier is even.

Selecting one of the processing pipelines based on the parity of the destination register specifier provides a simple technique for reducing the amount of inter-pipeline forwarding that requires little additional circuit resource. There is no need to monitor instructions in order to determine which instructions forward values to other instructions. Instructions with odd destination register specifiers are sent to one of the processing pipelines and instructions with even destination register specifiers are sent to another processing pipeline. This ensures that instructions specifying the same destination register are sent to the same pipeline, and since forwarding is more likely between such instructions the amount of inter-pipeline forwarding is reduced and so the overall performance of the system is improved.

In a further feature, the apparatus may be arranged so that:

said plurality of processing pipelines include a first processing pipeline and a second processing pipeline;

said destination register specifier has a plurality of bits including a pipeline selection bit at a predetermined bit position of said destination register specifier; and said instruction issuing circuitry is configured to select said first processing pipeline as said one of said plurality of processing pipelines if said pipeline selection bit has a value of one and to select said second processing pipeline as said one of said plurality of processing pipelines if said pipeline selection bit has a value of zero.

A destination register specifier consists of a plurality of bits which can each have a value of either one or zero. In a system having two processing pipelines, it is useful to use one of the bits of the register specifier as a pipeline selection bit and to select the pipeline to which the instruction is issued in dependence upon the value of the pipeline selection bit. If the pipeline selection bit has a value of one, then the instruction is issued to one pipeline and if the pipeline selection bit has a value of zero, then the instruction is issued to the other pipeline. Checking the value of a single bit is a simple operation that requires little processing overhead.

The pipeline selection bit can be the lowest order bit of the destination register specifier. In this case, the instructions will be sent to a pipeline selected depending on whether the destination register specifier is odd or even, as described above.

Alternatively, the pipeline selection bit can be a highest order bit of the destination register specifier. In this case, the registers are grouped into two blocks of registers and instructions specifying a destination register in a low-order block of registers are issued to one pipeline and instructions specifying a destination register in a high-order block of registers are issued to the other pipeline.

In a further feature, the apparatus may be arranged so that:

said plurality of processing pipelines comprise $2^X$ processing pipelines, X being an integer greater than zero; and said instruction issuing circuitry is configured to select said one of said plurality of processing pipelines in dependence upon a result of performing a modulo $2^X$ operation on said value of said destination register specifier.

The apparatus may include more than two processing pipelines. If the number of processing pipelines is a power of two, then a useful way of identifying a pipeline to which the candidate instruction should be issued is in dependence upon a result of performing a modulo $2^X$ operation on the destination register specifier. The modulo $2^X$ operation will have $2^X$ possible outcomes and so one of the $2^X$ processing pipelines can be selected in dependence upon the result of the modulo operation.

Although it will be appreciated that the present technique is applicable to any instruction specifying a destination register, one type of instruction which is often used in data processing apparatuses is a multiply accumulate instruction (also known as a multiply add instruction) for controlling a processing pipeline to calculate a product of a first operand and a second operand and to store in the destination register a sum of a value previously stored in the destination register and the product of the first and second operands.

The present technique is useful for multiply accumulate instructions because data processing apparatuses are often configured to execute a sequence of multiply accumulate instructions each accumulating to the same destination register in order to calculate a vector dot product A·B or cross product A×B (each of these quantities is calculated as a sum of several products, e.g. A·B=aw+bx+cy+dz). Each multiply accumulate instruction in the sequence, other than the first multiply accumulate instruction, requires the result of a preceding multiply accumulate instruction to be forwarded before it can be executed. Therefore, issuing such multiply accumulate instructions to one of the pipelines in dependence upon the value of the destination register specifier will ensure that all of the multiply accumulate instructions in the sequence are processed by the same one of the plurality of processing pipelines and so forwarding of result values between different processing pipelines is avoided.

Another type of instruction to which the present technique may be applied is a single-instruction-multiple-data (SIMD) instruction. At least some of the plurality of processing pipelines may be responsive to the SIMD instruction and an operand comprising a plurality of data fields to perform a processing operation on each of the plurality of data fields. SIMD instructions are useful for increasing the number of processing operations that can be performed on different data values in parallel to one another.

Some data processors supporting SIMD instructions divide a SIMD processing operation between multiple processing pipelines, each of the pipelines processing a different SIMD operand in parallel to one another. In such apparatuses, the operand may comprise N data fields, and X of the SIMD instructions may respectively control X of the plurality of processing pipelines to perform the processing operation on X×N data fields of X of the operands (where X and N are integers greater than 1).

The present technique is particularly useful for such apparatuses because they have a plurality of processing pipelines each for executing SIMD instructions and so the present technique can help improve the processing performance of the apparatus by reducing the amount of inter-pipeline forwarding that is needed to process the SIMD instructions.

A person skilled in the field of data processing apparatuses will appreciate that, although the plurality of registers are each of the same type of register, the apparatus could also include one or more further banks of registers of a different type to the plurality of registers. The different types of registers could include, for example, registers for storing integer values, registers for storing floating point values, and registers for storing SIMD operands comprising multiple data fields.

Viewed from another aspect the present invention provides an apparatus for processing data under control of instructions, said apparatus comprising:

a plurality of registers of a same type of register, said instructions including at least one instruction having a destination register specifier specifying which of said plurality of registers is a destination register for storing a processing result of said at least one instruction;

a plurality of processing pipeline means, each processing pipeline means being for processing said instructions and for storing processing results of said instructions in said plurality of registers; and instruction issuing means for issuing said at least one instruction for processing by one of said plurality of processing pipeline means, said instruction issuing means selecting said one of said plurality of processing pipeline means in dependence upon a value of said destination register specifier of said at least one instruction.

Viewed from yet another aspect the present invention provides a method of processing data under control of instructions and storing processing results of said instructions in a plurality of registers of a same type of register, said instructions including at least one instruction having a destination register specifier specifying which of said plurality of registers is a destination register for storing a processing result of said at least one instruction, said method comprising:

selecting one of a plurality of processing pipelines in dependence upon a value of said destination register specifier of said at least one instruction;

issuing said at least one instruction for processing by said one of said plurality of processing pipelines;

processing said at least one instruction using said one of said plurality of processing pipelines; and storing said processing result of said at least one instruction in said destination register.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
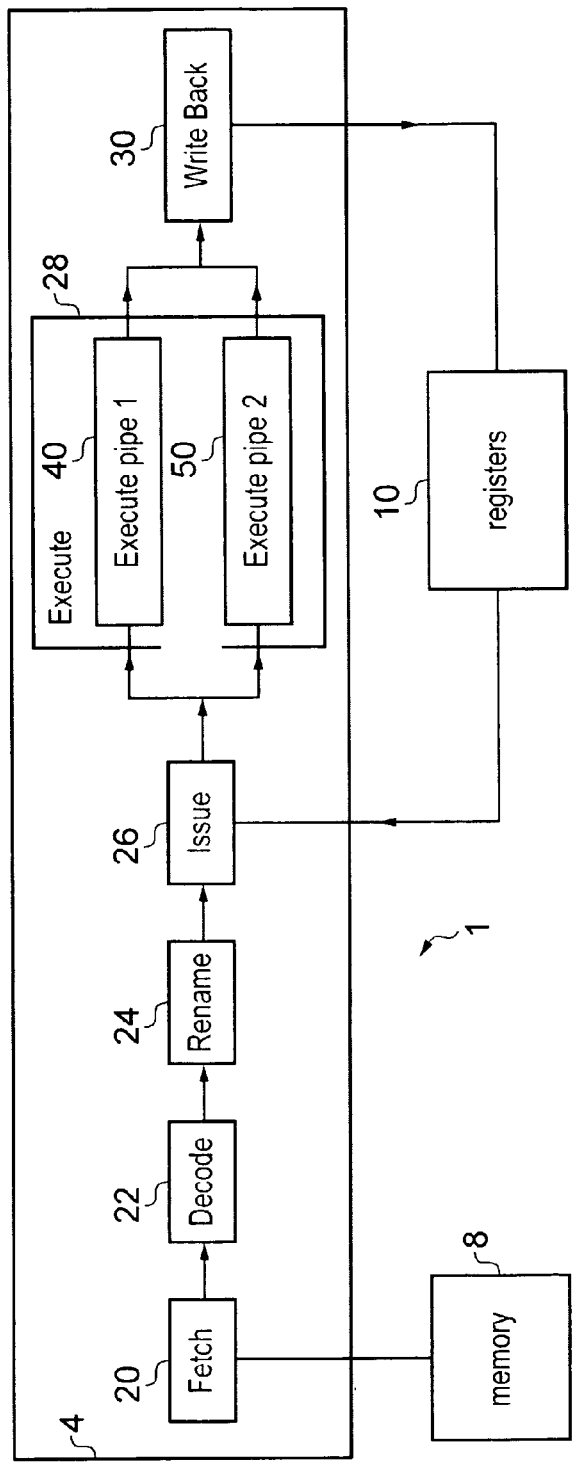
FIG. 1 schematically illustrates a data processing apparatus having more than one execution pipeline.

FIG. 1 shows a data processing apparatus 1 for processing a sequence of program instructions. Various elements of FIG. 1 will be described below, although it will be appreciated that the processor 1 will also include other elements and features that have not been illustrated for clarity.

The processor 1 includes a processing pipeline 4 coupled to a memory 8, and a bank of registers 10. The processing pipeline 4 processes sequences of instructions stored in the memory 8. Instructions processed by the processing pipeline 4 contain register specifiers identifying one or more registers within the register bank 10 which contain values that are to be used as operands for the instructions. The registers of the register bank 10 are all the same type of register, although it will be appreciated that further registers (not illustrated in FIG. 1) of a different type to the bank of registers 10 could be provided as well.

The processing pipeline 4 comprises a fetch stage 20 for fetching instructions from the memory 8; a decode stage 22 for decoding the instructions fetched from memory and generating decoded instructions; a rename stage 24 for renaming registers specified in the decoded instructions so as to avoid data hazards (such as read-after-write or write-after-write hazards); an issue stage 26 for issuing decoded instructions for execution; an execute stage 28 for executing decoded instructions; and a write back stage 30 for writing back results of executed instructions to the register file 10.

The execute stage 28 includes two execution pipelines 40, 50 for performing processing operations in response to the instructions issue by the issue stage 26. At least part of the execution pipeline 40 is the same as at least part of the execute pipeline 50 such that some instructions can be executed by either of the execution pipelines 40, 50. It will be appreciated that one or both of the execution pipelines 40, 50 could also have additional circuitry for executing an instruction that cannot be executed by the other one of the execution pipelines 40, 50.

The issue stage 26 schedules the order and timings with which the instructions are issued to the execute stage 28 and also selects to which of the execute pipelines 40, 50 a candidate instruction is issued. For instructions including a destination register specifier specifying which of the registers 10 is a destination register for storing a result of the instruction, the selection of execution pipeline 40, 50 is made in dependence upon the destination register specifier associated with the candidate instruction. This ensures that instructions having the same destination register are issued to the same one of the execution pipelines 40, 50. Forwarding is more likely between instructions having the same destination register than between instructions having different destination registers as when two instructions specify the same destination register then the value stored to the destination register by the first instruction is often used as an operand by the second instruction. Therefore, issuing instructions having the same destination register to the same execution pipeline means that it is more likely that any forwarding of operand values is between instructions processed by the same one of the execution pipelines 40, 50 rather than between instructions within different execution pipelines.

Figure 2:
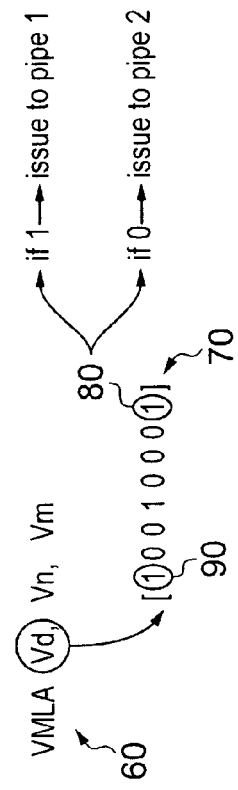
FIG. 2 shows an example of how an execution pipeline can be selected based on a destination register specifier of an instruction.

FIG. 2 illustrates an example of how the issue stage 26 can select to which pipeline a candidate instruction should be issued. An example of an instruction to which the present technique can be applied is a multiply accumulate instruction 60. The multiply accumulate instruction controls one of the execution pipelines 40, 50 to multiply two operands stored in registers Vn and Vm and to add the product of those two operands to a value stored in a destination register Vd. The result of the multiply accumulate instruction Vd+Vn*Vm is written to the destination register Vd. The destination register Vd is identified by a destination register specifier 70 including a number of bits, each bit having a value of one or zero. The issue stage 26 is responsive to a predetermined one of the bits of the destination register specifier to select the pipeline 40, 50 to which the instruction 60 should be issued. In the example of FIG. 2, the lowest order bit 80 of the destination register specifier 70 is used as a pipeline selection bit. If the pipeline selection bit 80 is equal to one then the candidate instruction is issued to the first execution pipeline 40. On the other hand, if the pipe selection bit 80 is equal to zero then the candidate instruction is issued to the second execution pipeline 50. Thus, the execution pipelines are selected based on the parity of the destination register specifier such that instructions with an odd destination register specifier are issued to one execution pipeline and instructions with an even destination register specifier are issued to another execution pipeline.

Although FIG. 2 has been illustrated showing the selection of execution pipelines 40, 50 based on the lowest order bit 80 of the register specifier 70, the issue stage 26 could instead select one of the execution pipelines 40, 50 based on the value of another bit of the destination register specifier 70. For example, the selection could be based on the highest-order bit 90, in which case the register bank 10 is effectively divided into two blocks of registers, such that instructions that specify a destination register in a low-order block of the register bank 10 are issued to one pipeline and instructions that specify a destination register in a high-order block of the register bank 10 are issued to another pipeline.

Figure 3:
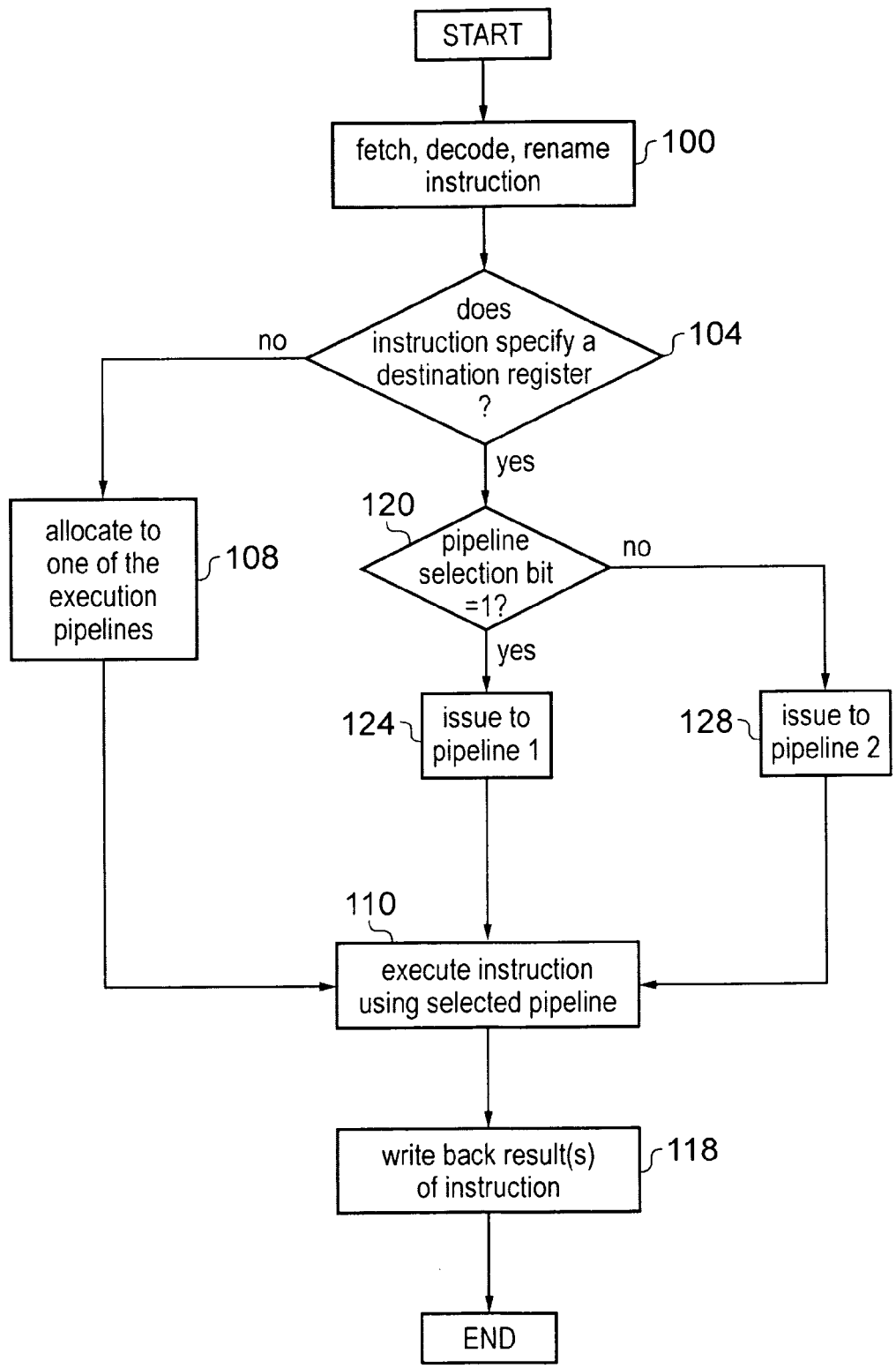
FIG. 3 is a flow diagram illustrating a process for processing a program instruction in a data processing apparatus.

FIG. 3 illustrates a process by which the processing pipeline 4 processes a program instruction. It should be noted that although in FIG. 3 the steps are shown in a particular order, some of the steps may be performed in parallel to one another. Also, in the pipeline 4 each of the stages operates simultaneously to process different instructions, so that while, for example, one instruction is being decoded by the decode stage 22, another instruction is being renamed at the rename stage 24, yet another instruction is being issued by the issue stage 26, and so on. Thus, many of the steps of FIG. 3 will actually be performed at the same time for different instructions in the pipeline.

The processing of an instruction begins at step 100 wherein the instruction is fetched from the memory 8 by the fetch stage 20 and decoded by the decode stage 22 in order to generate a decoded instruction (micro-operation). The instruction undergoes register renaming in the rename stage 24, which maps register specifiers specified in the instruction to physical registers in the register bank 10. Next, at step 104, the issue stage 26 determines whether the instruction specifies a destination register. Some instructions, such as compare instructions for comparing two values, do not specify a destination register. Other instructions, such as add or multiply instructions, include a destination register specifier identifying a register for storing a processing result of the instruction.

If at step 104 the issue stage 26 determines that the instruction does not specify a destination register, then flow proceeds to step 108 at which the issue stage 26 allocates the candidate instruction to one of the execution pipelines 40, 50. The issue stage 26 could select one of the execution pipelines at random or could use a predetermined selection criterion to select one of the pipelines (for example, based on which execution pipeline has the fewest pending instructions left to process). The instruction is then executed using the selected pipeline at step 110. One or more processing results of the instruction are then written back to the register bank 10 by the write back stage 30 at step 118.

If at step 104 it is determined that a candidate instruction specifies a destination register, then flow proceeds to step 120 at which point the issue stage 26 determines whether or not the pipeline selection bit equals one. If the pipeline selection bit equals one then at step 124 the first execution pipeline 40 is selected and the instruction is issued to the first execution pipeline 40. If at step 120 it is determined that the pipeline selection bit equals zero, then at step 128 the second execution pipeline 50 is selected and so the candidate instruction is issued to the second execution pipeline 50. Then, the candidate instruction is executed by the selected pipeline at step 110, and an execution result is stored in the destination register by the write back stage 30 at step 118.

Figure 4:
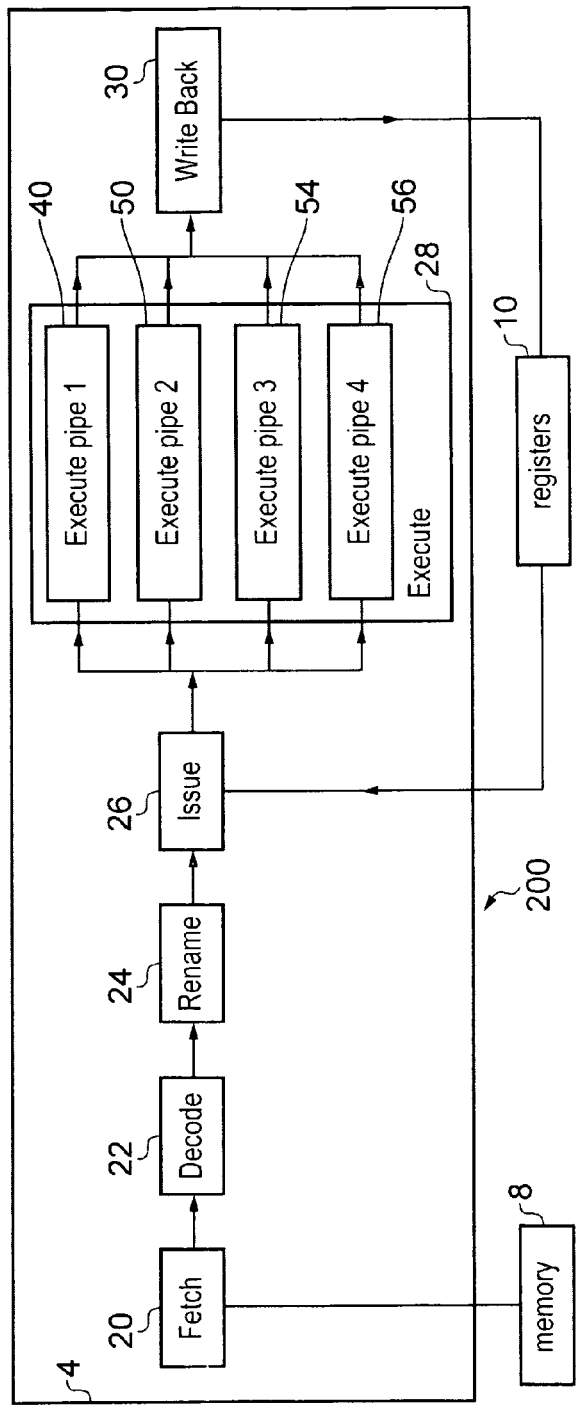
FIG. 4 shows another example of a data processing apparatus having multiple execution pipelines.

The above example has been explained with reference to a processing apparatus 1 having an execute stage 28 comprising two execute pipelines 40, 50. However, the data processing apparatus can have more than two execution pipelines. FIG. 4 shows a data processing apparatus 200 in which the execute stage 38 includes four execution pipelines 40, 50, 54, 56. The other elements of the data processing apparatus 200 are similar to those of data processing apparatus 1 and so have been indicated using the same reference numerals.

Figure 5:
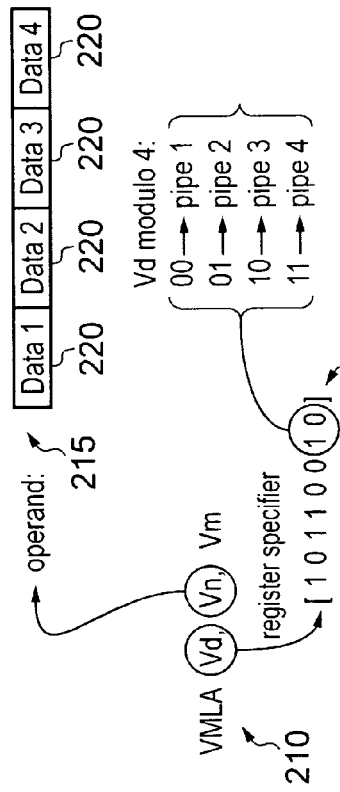
FIG. 5 shows an example of how a pipeline can be selected based on the result of performing a modulo operation on a destination register specifier of an instruction.

FIG. 5 shows an example of how the issue stage 26 of the data processing apparatus 200 can select one of the execution pipelines for executing a candidate instruction 210. In this example, the instruction 210 is a single-instruction-multiple-data (SIMD) instruction as it can process an operand 215 having a plurality of data fields 220. The SIMD instruction controls the execute stage 28 to perform the same data processing operation on each of the data fields 220 of the operand 215.

Since the number of execution pipelines 40, 50, 54, 56 of the data processing apparatus 200 is a power of two, a simple way of determining which of the execution pipelines a candidate instruction should be issued to is to perform a modulo operation on the destination register specifier 230. In this example, there are four pipelines and so a modulo 4 operation is performed on the destination register specifier 230. The issue stage 26 can then select one of the execution pipelines 40, 50, 54, 56 in dependence upon the result of the modulo 4 operation. Although one particular mapping between results of the modulo operation and the execution pipelines 40, 50, 54, 56 is shown in FIG. 5, it will be appreciated that many other mappings are also possible. For a register specifier 230 represented in binary form, the modulo 4 operation is equivalent to determining the value of the two lowest-order bits of the register specifier 230.

If the number of execution pipelines is not a power of two then the register bank 10 could be divided into several groups (the number of groups being equal to the number of execution pipelines) and the issue stage 26 could select one of the execution pipelines for executing a candidate instruction in dependence upon which of the groups of registers includes the destination register specified by the candidate instruction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus for processing data under control of instructions, said apparatus comprising:
a plurality of registers of a same type of register, said instructions including at least one instruction having a destination register specifier specifying which of said plurality of registers is a destination register for storing a processing result of said at least one instruction;
a plurality of processing pipelines, each processing pipeline configured to process said instructions and to store processing results of said instructions in said plurality of registers; and
instruction issuing circuitry configured to issue said at least one instruction for processing by one of said plurality of processing pipelines, said instruction issuing circuitry being configured to select said one of said plurality of processing pipelines in dependence upon a value of said destination register specifier of said at least one instruction.

2. An apparatus according to claim 1, wherein said plurality of processing pipelines include a first processing pipeline and a second processing pipeline; and
said instruction issuing circuitry is configured to select said first processing pipeline as said one of said plurality of processing pipelines if said value of said destination register specifier is odd and to select said second processing pipeline as said one of said plurality of processing pipelines if said value of said destination register specifier is even.

3. An apparatus according to claim 1, wherein said plurality of processing pipelines include a first processing pipeline and a second processing pipeline;
said destination register specifier has a plurality of bits including a pipeline selection bit at a predetermined bit position of said destination register specifier; and
said instruction issuing circuitry is configured to select said first processing pipeline as said one of said plurality of processing pipelines if said pipeline selection bit has a value of one and to select said second processing pipeline as said one of said plurality of processing pipelines if said pipeline selection bit has a value of zero.

4. An apparatus according to claim 3, wherein said pipeline selection bit is a lowest order bit of said destination register specifier.

5. An apparatus according to claim 3, wherein said pipeline selection bit is a highest order bit of said destination register specifier.

6. An apparatus according to claim 1, wherein said plurality of processing pipelines comprise $2^X$ processing pipelines, X being an integer greater than zero; and
said instruction issuing circuitry is configured to select said one of said plurality of processing pipelines in dependence upon a result of performing a modulo $2^X$ operation on ue of said destination register specifier.

7. An apparatus according to claim 1, wherein said at least one instruction includes a multiply accumulate instruction and at least some of said plurality of processing pipelines are responsive to said multiply accumulate instruction to calculate a product of a first operand and a second operand and to store in said destination register a sum of said product and a value previously stored in said destination register.

8. An apparatus according to claim 1, wherein said at least one instruction includes at least one single-instruction-multiple-data (SIMD) instruction and at least some of said plurality of processing pipelines are each responsive to said SIMD instruction and an operand comprising a plurality of data fields to perform a processing operation on each of said plurality of data fields.

9. An apparatus according to claim 8, wherein said operand comprises N data fields; and X of said SIMD instructions respectively control X of said plurality of processing pipelines to perform said processing operation on the N data fields of X of said operands, X and N being integers greater than one.

10. An apparatus for processing data under control of instructions, said apparatus comprising:
a plurality of registers of a same type of register, said instructions including at least one instruction having a destination register specifier specifying which of said plurality of registers is a destination register for storing a processing result of said at least one instruction;
a plurality of processing pipeline means, each processing pipeline means being for processing said instructions and for storing processing results of said instructions in said plurality of registers; and
instruction issuing means for issuing said at least one instruction for processing by one of said plurality of processing pipeline means, said instruction issuing means selecting said one of said plurality of processing pipeline means in dependence upon a value of said destination register specifier of said at least one instruction.

11. A method of processing data under control of instructions and storing processing results of said instructions in a plurality of registers of a same type of register, said instructions including at least one instruction having a destination register specifier specifying which of said plurality of registers is a destination register for storing a processing result of said at least one instruction, said method comprising:

selecting one of a plurality of processing pipelines in dependence upon a value of said destination register specifier of said at least one instruction;

issuing said at least one instruction for processing by said one of said plurality of processing pipelines;

processing said at least one instruction using said one of said plurality of processing pipelines; and storing said processing result of said at least one instruction in said destination register.

12. A method according to claim 11, wherein said plurality of processing pipelines include a first processing pipeline and a second processing pipeline;

said first processing pipeline is selected as said one of said plurality of processing pipelines if said value of said destination register specifier is odd; and said second processing pipeline is selected as said one of said plurality of processing pipelines if said value of said destination register specifier is even.

13. A method according to claim 11, wherein said plurality of processing pipelines include a first processing pipeline and a second processing pipeline;

said destination register specifier has a plurality of bits including a pipeline selection bit at a predetermined bit position of said destination register specifier;

said first processing pipeline is selected as said one of said plurality of processing pipelines if said pipeline selection bit has a value of one; and said second processing pipeline is selected as said one of said plurality of processing pipelines if said pipeline selection bit has a value of zero.

14. A method according to claim 13, wherein said pipeline selection bit is a lowest order bit of said destination register specifier.

15. A method according to claim 13, wherein said pipeline selection bit is a highest order bit of said destination register specifier.

16. A method according to claim 11, wherein said plurality of processing pipelines comprise $2^X$ processing pipelines, X being an integer greater than zero; and said one of said plurality of processing pipelines is selected in dependence upon a result of performing a modulo $2^X$ operation on said value of said destination register specifier.

17. A method according to claim 11, wherein said at least one instruction includes a multiply accumulate instruction and at least some of said plurality of processing pipelines are responsive to said multiply accumulate instruction to calculate a product of a first operand and a second operand and to store in said destination register a sum of said product and a value previously stored in said destination register.

18. A method according to claim 11, wherein said at least one instruction includes at least one single-instruction-multiple-data (SIMD) instruction and at least some of said plurality of processing pipelines are each responsive to said SIMD instruction and an operand comprising a plurality of data fields to perform a processing operation on each of said plurality of data fields.

19. A method according to claim 18, wherein said operand comprises N data fields; and X of said SIMD instructions respectively control X of said plurality of processing pipelines to perform said processing operation on the N data fields of X of said operands, X and N being integers greater than one.

* * * * *